(12) United States Patent
Biel et al.

(10) Patent No.: US 8,033,761 B2
(45) Date of Patent: Oct. 11, 2011

(54) METHOD AND DEVICE FOR TRANSPORTING A MOLDED OBJECT

(75) Inventors: Roger Biel, Aschaffenburg (DE); Günter Lässig, Obernburg (DE)

(73) Assignee: Novartis AG, Basel (CH)

( * ) Notice: Subject to any disclaimer, the term of this patent is extended or adjusted under 35 U.S.C. 154(b) by 170 days.

(21) Appl. No.: 12/079,197

(22) Filed: Mar. 25, 2008

(65) Prior Publication Data

US 2008/0240890 A1 Oct. 2, 2008

(30) Foreign Application Priority Data

Mar. 27, 2007 (EP) .................................. 07105049

(51) Int. Cl.
*B65G 53/00* (2006.01)
(52) U.S. Cl. .......................................... 406/88; 406/197
(58) Field of Classification Search .................. 406/86, 406/88, 108, 191, 194, 46–48, 197, 29, 198, 406/12, 17; 134/901; 221/278
See application file for complete search history.

(56) References Cited

U.S. PATENT DOCUMENTS

| | | | | | |
|---|---|---|---|---|---|
| 2,744,286 | A | * | 5/1956 | Carpenter et al. | 264/335 |
| 2,801,884 | A | * | 8/1957 | Friedman | 406/108 |
| 2,912,282 | A | * | 11/1959 | Schult | 406/52 |
| 2,993,737 | A | * | 7/1961 | Stephen | 406/34 |
| 4,343,575 | A | * | 8/1982 | Kimball | 406/19 |
| 4,410,103 | A | * | 10/1983 | Fuhrmeister | 221/25 |
| 5,040,353 | A | * | 8/1991 | Evans et al. | 53/54 |
| 6,443,669 | B2 | * | 9/2002 | Saito | 406/28 |

FOREIGN PATENT DOCUMENTS

| JP | 07-061589 | 3/1995 |
|---|---|---|
| JP | 2002-370822 | 12/2002 |

* cited by examiner

*Primary Examiner* — Gene Crawford
*Assistant Examiner* — William R Harp
(74) *Attorney, Agent, or Firm* — Robert A. Ambrose

(57) ABSTRACT

A method for transporting a molded object, in particular an ophthalmic lens, specifically a contact lens (CL), in which a molded object is lifted up from a supporting surface (1) and transported to a destination, such that the molded object is acted upon by a fluid so that it is lifted up from the supporting surface (1) and transported to the destination through a transport line (2).

11 Claims, 5 Drawing Sheets

METHOD AND DEVICE FOR TRANSPORTING A MOLDED OBJECT

This application claims foreign priority under 35 U.S.C. §119 of European Patent Application No. 07105049.6 filed Mar. 27, 2007, incorporated by reference in its entirety.

FIELD

The present invention relates to a method and a device for transporting a molded object, in particular an ophthalmic lens, specifically a contact lens according to the preamble of the independent patent claim. This method and device are suitable for use in automated production of molded objects, in particular ophthalmic lenses, specifically contact lenses.

BACKGROUND

In mass production of contact lenses, specifically so-called disposable lenses, a large number of contact lenses must be manufactured in a relatively short period of time. In a preferred method of mass production, a starting material, e.g., a prepolymer solution containing water, is introduced into a female mold half, the casting mold is closed by the respective male mold half and then the starting material is polymerized and/or crosslinked photometrically with the help of UV light. The mold halves mask the UV light in the respective areas which are outside of the areas required for contact lens production. Cyclic mass production of contact lenses is described in WO 98/42497, for example. Suitable polymers formed by photochemical polymerization of suitable prepolymers include polymers based on polyvinyl alcohols (PVA) or silicone hydrogels (SiHy) as well as based on polyethylene glycols (PEG).

After polymerization and/or crosslinking and then opening the casting molds, the contact lenses must be removed from the mold halves and brought to the next production station, e.g., the coating station, the cleaning station or the inspection station. To do so, it is typical to use vacuum gripper, which are robot-controlled and with the help of a vacuum grip the contact lenses with suction, convey them further and then deposit them at the desired destination. So-called mechanical tweezers grippers are also known. Disadvantages of most of these mechanical approaches include not only the high cost of the robot systems but also the mechanical stress and the risk of damage to the contact lenses. For example, silicone hydrogels (SiHy) are used for the production of extremely oxygen-permeable contact lenses; they may adhere so tightly to the mold half that mechanical transport tools are unable to easily lift the contact lenses up from the mold halves and transport them. It may also happen that after the contact lenses have been lifted, they cannot be removed from the grippers easily.

SUMMARY

The object of the present invention is to propose a method and a device for transporting molded objects, in particular ophthalmic lenses, specifically contact lenses, that will not have the disadvantages mentioned above and in particular are able to lift the molded objects, e.g., contact lenses based on silicone hydrogel (SiHy), that are adhering firmly to the mold half, and transport them away from the mold half, then deposit them again without sticking to the mechanical grippers.

This object is achieved with the help of the inventive method as characterized by the features of the independent method claim. Advantageous variants of the inventive method are the subject matter of the dependent method claims. This object is achieved in particular by a method in which the molded object is acted upon with a fluid in such a way that it is lifted up from the supporting surface on which it is deposited and is transported to the destination through a transport line. The molded object is not exposed to any mechanical contact stresses in this process. The fact that even molded objects made of well-adhering starting materials, such as silicone hydrogels (SiHy), can be lifted and transported in this way and will not adhere to mechanical (contact) grippers is also an advantage.

In one variant of this method, ethanol, water, nitrogen or diethylene glycol monoethyl ether is used as the possible fluid. Depending on the starting material used, ethanol, water, nitrogen or diethylene glycol monoethyl ether is capable of reliably lifting the molded object away from the supporting surface and is capable of conforming to the requirements of explosion safety in particular. Air may be used in another process variant. In another process variant, the fluid is supplied by means of nozzles, which may be accomplished in yet another process variant in such a way that the molded object is exposed to the fluid from the first nozzles in the area of its edge. Acting upon the molded object with fluid in its edge area allows reliable lifting of the molded object away from the supporting surface. In another variant of the process, second nozzles act upon the molded object in the area between the edge area and the center of the molded object. The fact that the molded object is acted upon with the help of the second nozzles in the area between the edge area and the center of the molded object may be used to prevent the molded object from being inverted when it is lifted up from the supporting surface. In another process variant, the fluid is supplied separately to the nozzles because, depending on the starting material and the design of the molded object, the lifting behavior may be different and the supply of fluid can be controlled in a flexible manner, depending on the lifting behavior.

In a special process variant, the molded object is lifted up from the shaping surface of a female or male mold half, e.g., the female or male mold half of a contact lens mold.

In another possible process variant, a flexible transport line is used. To do so, a flexible transport line made of plastic, in particular polyethylene (PE), polypropylene (PP), polyethylene terephthalate (PET) or polytetrafluoroethylene (PTFE) may be used.

The inventive device for transporting a molded object, in particular an ophthalmic lens, specifically a contact lens, from a supporting surface on which the molded object is situated to a destination comprises means for exposing the molded object to the action of a fluid and a transport line, designed and arranged so that when the fluid acts on the molded object, the molded object is lifted up from the supporting surface and is transported to the destination through the transport line. Due to the fact that the transport line always leads to the same destination, it is possible to omit the complex robot control required for conventional transport by means of mechanical grippers.

In an exemplary embodiment of the inventive device, it comprises a head which is provided with nozzles. The head has an outlet connected to the transport line through which the molded objects are transported. In a refinement of this exemplary embodiment of the device, the head has a funnel-shaped area, the tapered end of which opens into the outlet connected to the transport line. The funnel-shaped area in the head of the device is an advantage in so far, as it ensures that enough space is available to reliably guide the contact lens that has been lifted up to the transport line, so that the contact lens can roll up (like a cigar) on its path leading into the further transport line.

BRIEF DESCRIPTION OF THE DRAWINGS

The inventive method and the inventive device are described in greater detail below with reference to the accompanying drawings, in which (in sectional diagrams).

DETAILED DESCRIPTION

Figures 1, 2, 3:
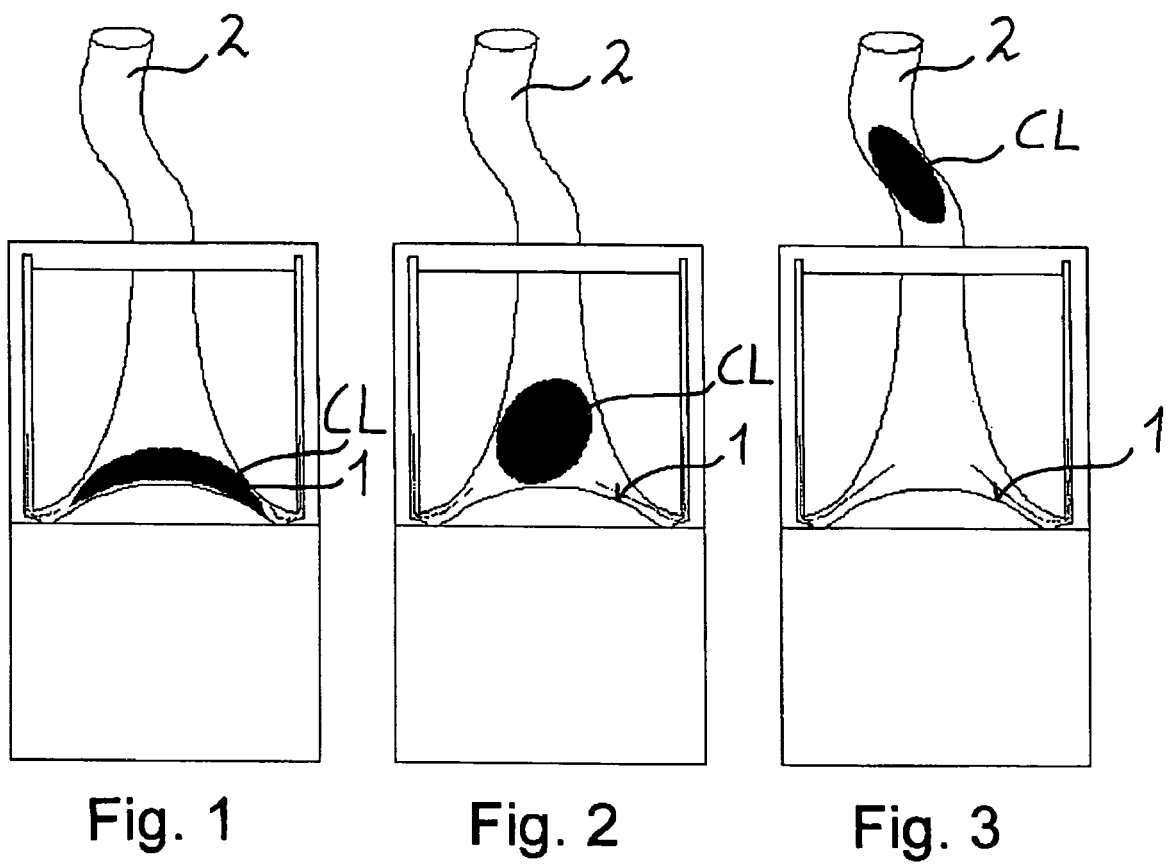
FIG. 1 shows a basic diagram of an exemplary embodiment of an inventive device placed on a male mold half, such that the molded object in the form of a contact lens still rests on the shaping surface.
FIG. 2 shows the basic diagram from FIG. 1, in which the contact lens has already been lifted up from the shaping surface.
FIG. 3 shows the basic diagram from FIG. 1, in which the contact lens is already in the transport line and is being transported further to the destination.

In the basic diagrams in FIGS. 1 through 3, three steps of the inventive method can be seen. First the molded object is in the form of a contact lens CL on the supporting surface 1 (here: the shaping surface of a male mold half of a contact lens mold). The contact lens CL is lifted up from the supporting surface 1 by the action of the fluid on the contact lens in the edge area. FIG. 2 shows the contact lens CL on its way to the transport line 2 after having been already lifted up from the supporting surface 1. FIG. 3 shows the contact lens CL at a point in time when it has already entered into the transport line 2 through which it is transported to a desired destination (e.g., to the next station in an installation for manufacturing contact lenses). On entering the transport line 2, the contact lens rolls up (like a cigar).

Figure 4:
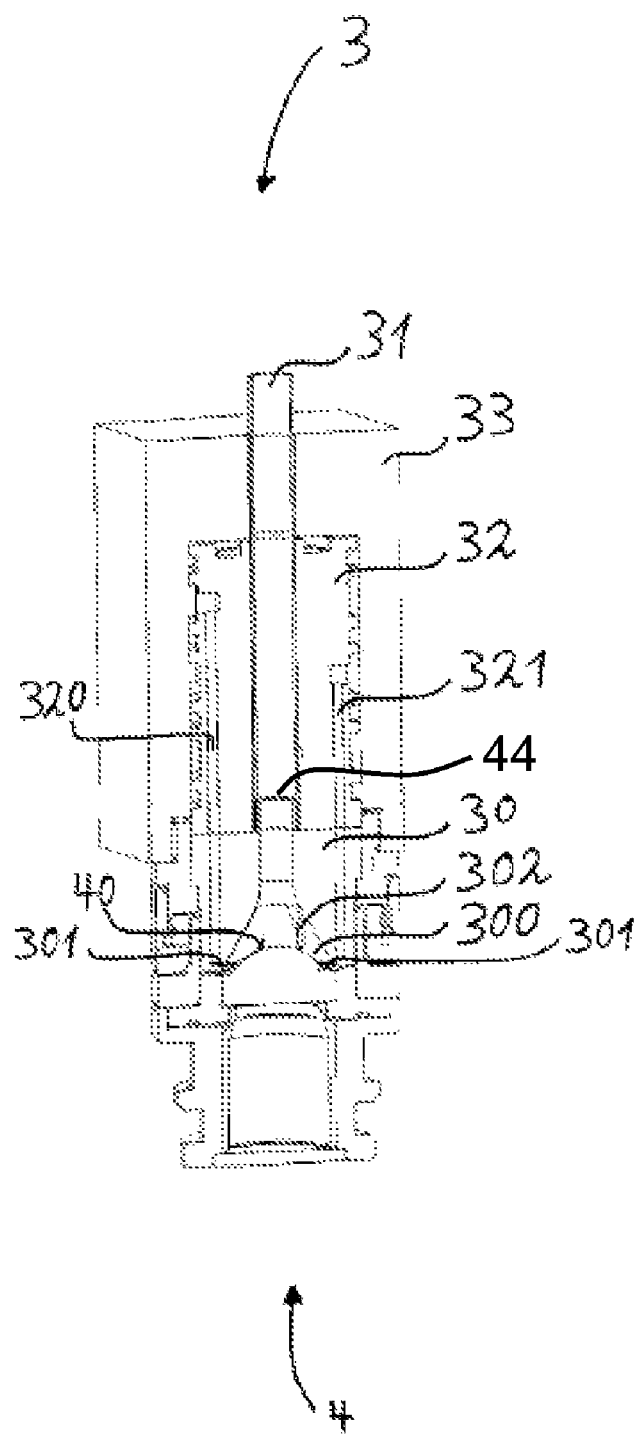
FIG. 4 shows a concrete exemplary embodiment of the inventive device, which can pick up a contact lens from the male mold half and transport it.

FIG. 4 shows an exemplary embodiment of the inventive device 3 for transporting a contact lens, said device having a head 30, a transport line 31 and an insert 32 arranged in a housing 33 with feed lines 320 and 321 for the fluid. The head 30 has a funnel-shaped area 300, which comes to lie above the convex shaping surface 40 of the male mold half 4 and whose tapered end opens into an outlet 44 designed as a connection that is connected to the transport line 31. The transport line 31 then runs through the insert 32 and the housing 33 to the destination. The head 30 carries the feed lines 320 and 321 of the insert 32 further, the fluid being supplied through these feed lines to the nozzles 301 and 302 arranged in the head 30. The nozzles 301 are arranged so that they act upon the molded object at its edge while the nozzles 302 are arranged so that they act upon the contact lens in the area between the edge area and the center of the contact lens. The housing 33 surrounds the insert 32, has an opening for passing the transport line 31 through it and has terminals (not visible) for the separate control of the feed lines.

In production of contact lenses, the casting mold is opened after the casting operation and the subsequent polymerization and/or crosslinking, and then after optionally releasing the contact lens which adheres to the male mold half, the head 30 of the inventive device 3 is placed on the male mold half 4. Then a fluid is supplied through the feed lines 320 and 321 to act upon the contact lens in its edge area with the help of the nozzles 301. In doing so, the contact lens is lifted up from the shaping surface 40 of the male mold half 4 and conveyed into the funnel-shaped area 300 of the head 30. The different nozzles 301 in the edge area can be controlled separately through separate feed lines 320 and 321 to be able to accomplish individual lifting operations, depending on the material and the design of the contact lenses. The contact lens can be prevented from being inverted by simultaneously acting upon the contact lens with fluid through the nozzles 302, which can be controlled separately from the nozzles 301, and being able to act upon the contact lens in the area between the edge and the center of the contact lens. However, this is only an option and is not mandatory. After lifting the contact lens from the shaping surface 40, i.e., on its way through the funnel-shaped area 300 and on entering the transport line 31, the contact lens rolls up like a cigar. Then the contact lens is transported together with the fluid flowing through the transport line 31. It is also conceivable, although not necessary, to additionally apply a vacuum to the transport line 31. For example, the fluid may be supplied at a pressure of 0.5 to 4 bar for water and 0.5 to 4 bar for ethanol. Alternatively, nitrogen, diethylene glycol monoethyl ether or air may be supplied as the fluid with suitable pressures accordingly. The transport line 31 leading away may have a diameter of 2-8 mm, for example, in particular approximately 4 mm.

Figure 5:
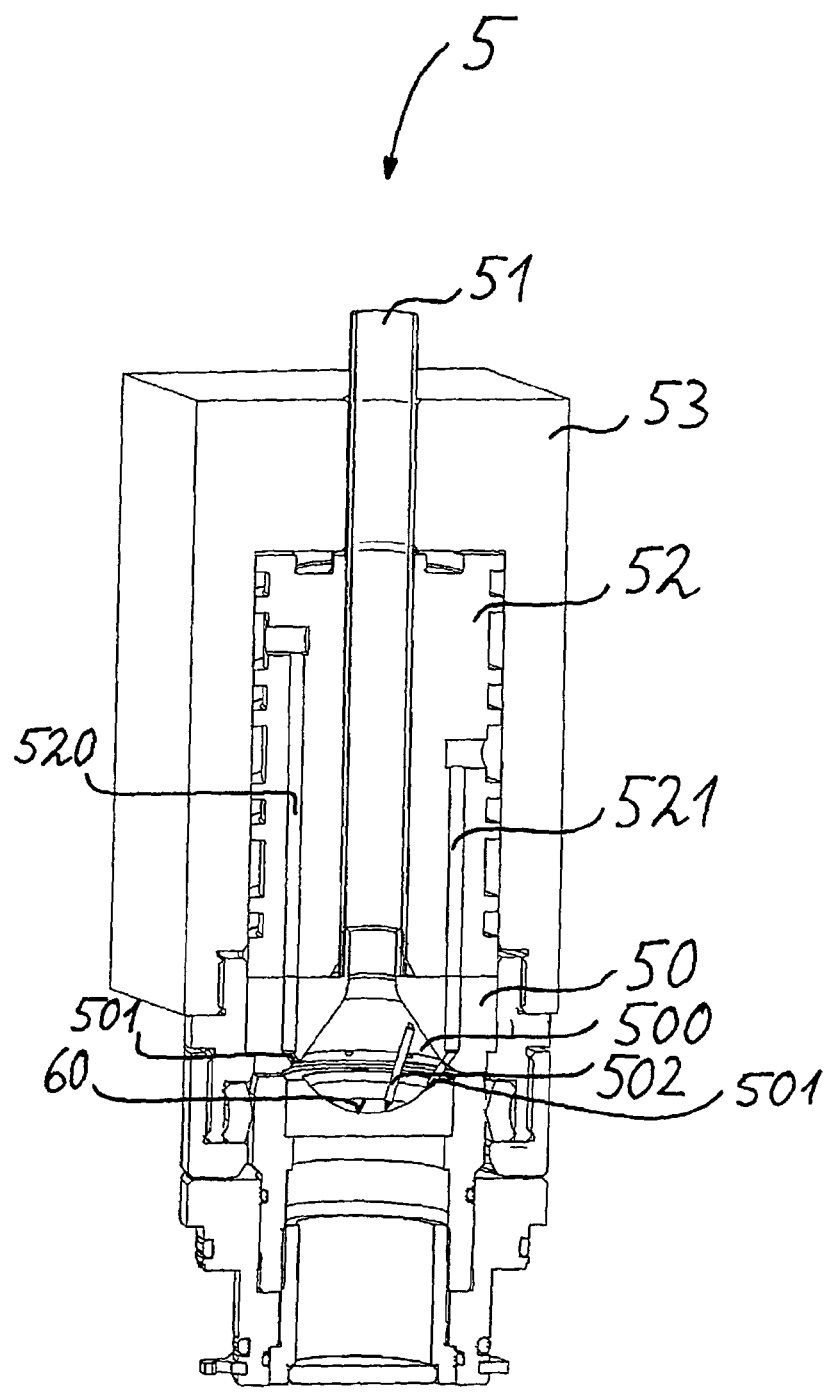
FIG. 5 shows an exemplary embodiment of the inventive device like that in FIG. 4, but this device can pick up a contact lens from a female mold half and transport it.

FIG. 5 shows an exemplary embodiment of the inventive device 5 by analogy with FIG. 4 for transporting a contact lens, said device having a head 50, a transport line 51 and an insert 52 arranged in a housing 53 with feed lines 520 and 521 for the fluid. The head 50 has a funnel-shaped area 500 which comes to lie above the concave shaping surface 60 of the female mold half 6 and whose tapered end opens into an outlet designed as a connection connecting to the transport line 51. The transport line 51 then runs through the insert 52 and the housing to the destination. The head 50 carries the feed lines 520 and 521 of the insert 52 further, the fluid being supplied through said feed lines to the nozzles 501 and 502 arranged in the head 50. The nozzles 501 are arranged in such a way that they act upon the contact lens at its edge, while the nozzles 502 are arranged in such a way that they act upon the contact lens in the area between the edge and the center of the contact lens. The housing 53 surrounds the insert 52 and has an opening for passing the transport line 51 through it as well as having connections (not shown here) for separate control of the feed lines.

Figure 6:
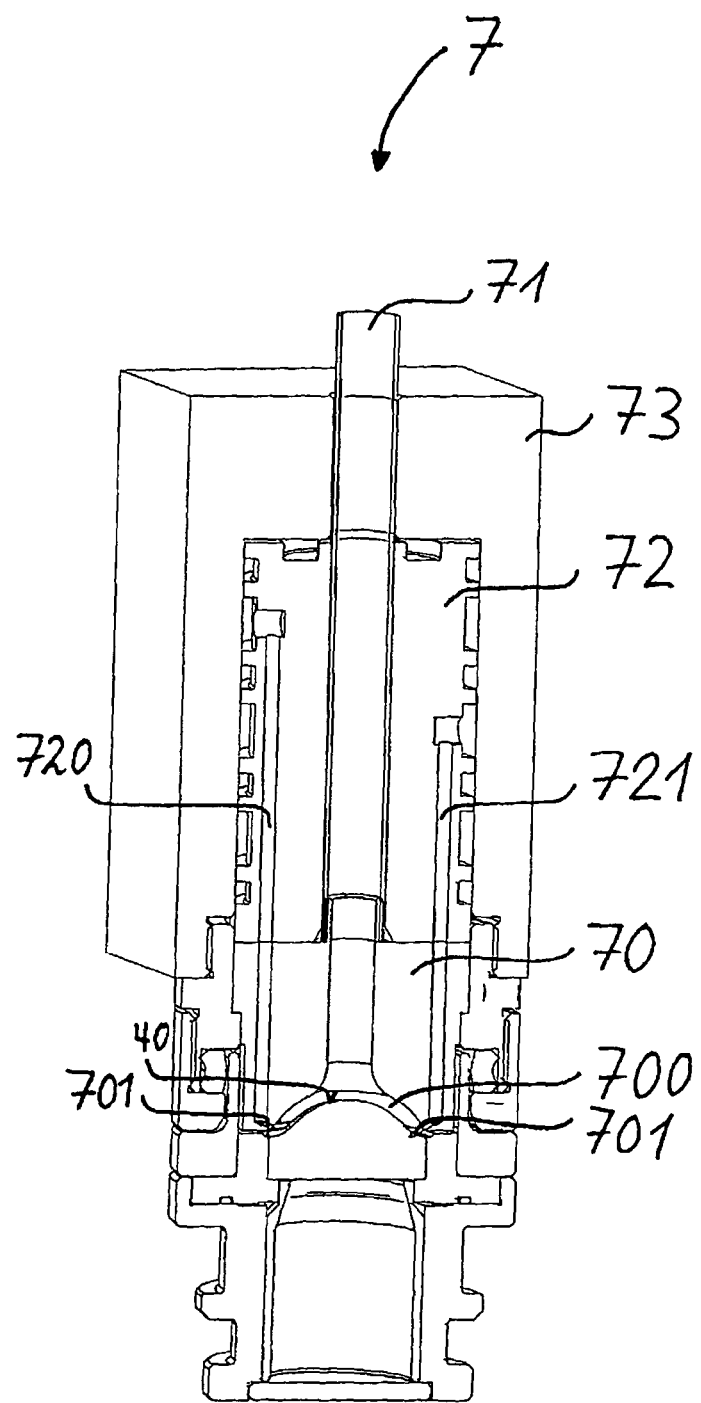
FIG. 6 shows another concrete exemplary embodiment of the inventive device, which can pick up a contact lens from a male mold half and transport it.

FIG. 6 shows another exemplary embodiment of the inventive device 7 for transporting a contact lens, said device having a head 70, a transport line 71 and an insert 72 arranged in a housing 73 with a feed line 720 and 721 for the fluid. The head 70 has a funnel-shaped area 700 which comes to lie above the convex shaping surface 40 of the male mold half 4 and whose tapered end opens into an outlet designed as a connection connected to the transport line 71. The transport line 71 then runs through the insert 72 and the housing to the destination. The head 70 carries the feed lines 720 and 721 of the insert 72 further, the fluid being supplied through said feed lines to the nozzles 701 arranged in the head. The nozzles 701 are arranged in such a way that they act upon the contact lens at the edge. The housing 73 surrounds the insert 72 and has an opening for passing the transport line 71 and the connections (not shown here) through it for separate control of the feed lines 720 and 721. In this exemplary embodiment, there are no other nozzles that could act upon the contact lens in the area between the edge and the center of the contact lens. Nevertheless, the different nozzles 701 can be controlled separately in the edge area through separate feed lines 720 and 721 to be able to execute individual lifting operations, depending on the material and the lifting behavior of the contact lens.

Figure 7:
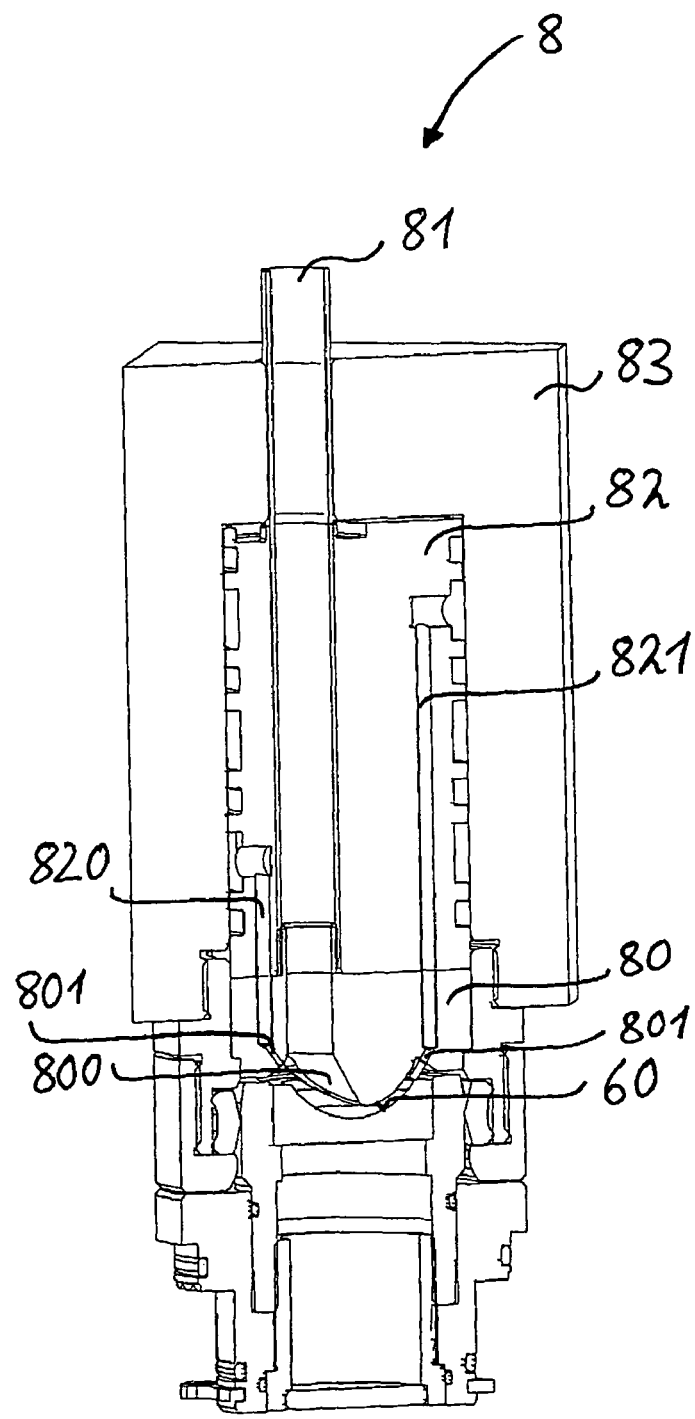
FIG. 7 shows another exemplary embodiment of the inventive device, which can pick up a contact lens from a female mold half and transport it.

FIG. 7 shows another exemplary embodiment of the inventive device 8 for transporting a contact lens, said device having a head 80, an eccentrically arranged transport line 81 and an insert 82 arranged in a housing 83 with feed lines 820 and 821 for the fluid. The head 80 has a funnel-shaped area 800, which is also arranged eccentrically and comes to lie above the concave shaping surface 60 of the female mold half 6 and whose tapered end opens into an outlet designed as a connection connected to the transport line 81. The transport line 81 then runs through the insert 82 and the housing 83 to the destination. The head 80 carries the feed lines 820 and 821 of the insert 82 further, the fluid being supplied through these feed lines to the nozzles 801 arranged in the head. The nozzles 801 are arranged in such a way that they act upon the edge of the contact lens. The housing 83 surrounds the insert 82, has an opening for passing the transport line 81 through it as well as connections (not shown here) for separate control of the feed lines 820 and 821. In this exemplary embodiment, there are no other nozzles that could act upon the contact lens in the area between the edge and the center of the contact lens. Nevertheless, the different nozzles 801 can be controlled separately in the edge area through separate feed lines 820 and 821 to allow individual lifting operations to be performed, depending on the material and the lifting behavior of the contact lens.

The invention claimed is:

1. A method for transporting an ophthalmic lens, comprising the steps of lifting the ophthalmic lens from a supporting surface and transporting the ophthalmic lens through a transport line to a destination, wherein during the steps of lifting and transporting the ophthalmic lens, the ophthalmic lens is acted upon by a fluid in such a way that the ophthalmic lens is lifted from the supporting surface and is transported through the transport line to the destination, and further wherein during the step of transporting the ophthalmic lens, the ophthalmic lens rolls up.

2. The method according to claim 1, wherein the fluid used is selected from the group consisting of ethanol, water, nitrogen and diethylene glycol monoethyl ether.

3. The method according to claim 1, wherein the fluid used is air.

4. The method according to claim 1, wherein the fluid acting upon the ophthalmic lens is supplied by means of nozzles.

5. The method according to claim 4, wherein the nozzles comprise first nozzles, which are arranged in such a way that they act upon the ophthalmic lens in the area of its edge.

6. The method according to claim 5, wherein the nozzles comprise second nozzles, which are arranged in such a way that they act upon the ophthalmic lens in the area between the edge and the center of the ophthalmic lens.

7. The method according to claim 6, wherein the fluid is supplied separately to the nozzles.

8. The method according to claim 1, wherein the supporting surface from which the ophthalmic lens is lifted is the shaping surface of a female mold half or a male mold half.

9. The method according to claim 1, wherein a flexible transport line is used as the transport line.

10. The method according to claim 9, wherein a transport line made of plastic is used as the flexible transport line, the plastic selected from the group consisting of polyethylene, polypropylene, polyethylene terephthalate and polytetrafluoroethylene.

11. The method according to claim 1, wherein the ophthalmic lens to be transported is a contact lens.

* * * * *